(12) United States Patent
Merino Lopez et al.

(10) Patent No.: US 9,772,258 B2
(45) Date of Patent: Sep. 26, 2017

(54) METHOD FOR TESTING THE RESISTANCE OF A TYRE TO PRESSURE LOSS

(71) Applicants: COMPAGNIE GENERALE DES ETABLISSEMENTS MICHELIN, Clermont-Ferrand (FR); Michelin Recherche et Technique S.A., Granges-Paccot (FR)

(72) Inventors: Jose Merino Lopez, Clermont-Ferrand (FR); Michel Ahouanto, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 293 days.

(21) Appl. No.: 14/374,950

(22) PCT Filed: Feb. 15, 2013

(86) PCT No.: PCT/EP2013/053121
§ 371 (c)(1),
(2) Date: Jul. 28, 2014

(87) PCT Pub. No.: WO2013/121019
PCT Pub. Date: Aug. 22, 2013

(65) Prior Publication Data
US 2015/0007645 A1    Jan. 8, 2015

(30) Foreign Application Priority Data

Feb. 16, 2012 (FR) .................... 12 51436

(51) Int. Cl.
*G01M 17/02* (2006.01)
*B29D 30/06* (2006.01)
(Continued)

(52) U.S. Cl.
CPC ........ *G01M 17/02* (2013.01); *B29D 30/0061* (2013.01); *B29D 30/0685* (2013.01);
(Continued)

(58) Field of Classification Search
CPC .......... G01L 17/00; G01M 17/02; G01F 1/00; B29D 30/0685; B29D 2030/0686; B29D 2030/0066; B29D 30/0061; B29C 73/163
See application file for complete search history.

(56) References Cited

U.S. PATENT DOCUMENTS 2,756,801 A  7/1956  Iknayan et al.
3,843,586 A  10/1974  Wolf ................ 260/29.7 R
(Continued)

FOREIGN PATENT DOCUMENTS

EP  0 753 420 A2  1/1997
FR  2 334 518 A1  7/1977
(Continued)

OTHER PUBLICATIONS

English translation of Office Action dated Jan. 25, 2016, issued by SIPO in connection with Chinese Application No. 201380009151.7.
(Continued)

*Primary Examiner* — Paul West
*Assistant Examiner* — Xin Zhong
(74) *Attorney, Agent, or Firm* — Fitzpatrick, Cella, Harper & Scinto

(57) ABSTRACT

A method for testing a punctured tyre's resistance to a loss in pressure includes: creating a plurality of punctures in a wall of the tyre by inserting a plurality of puncturing objects through the wall; running the tyre with the puncturing objects in the wall thereof over a given distance with a regulated inflation pressure; stopping the running of the tyre;
(Continued)

and determining, for each puncture, a pressure loss resistance index based on an estimate of a leak rate of the puncture.

23 Claims, 3 Drawing Sheets

(51) Int. Cl.
*B29D 30/00* (2006.01)
*G01F 1/00* (2006.01)
*G01L 17/00* (2006.01)
*B29C 73/16* (2006.01)

(52) U.S. Cl.
CPC ............... *G01F 1/00* (2013.01); *G01L 17/00* (2013.01); *B29C 73/163* (2013.01); *B29D 2030/0686* (2013.01)

(56) References Cited

U.S. PATENT DOCUMENTS

| 4,057,090 | A | 11/1977 | Hoshikawa et al. | 152/347 |
|---|---|---|---|---|
| 4,282,052 | A | 8/1981 | Dobson | 156/79 |
| 4,426,468 | A | 1/1984 | Ornum et al. | 523/166 |
| 4,501,825 | A | 2/1985 | Magyar et al. | 521/78 |
| 4,539,344 | A | 9/1985 | Van Ornum et al. | 523/166 |
| 5,916,931 | A | 6/1999 | Adams et al. | 523/166 |
| 8,573,271 | B2 | 11/2013 | Lopez et al. | 152/502 |
| 8,757,233 | B2 | 6/2014 | Merino Lopez et al. | 152/502 |
| 8,833,415 | B2 | 9/2014 | Greiveldinger et al. | 152/502 |
| 2009/0272476 | A1* | 11/2009 | Wilson | B29C 73/163 152/502 |
| 2010/0032070 | A1 | 2/2010 | Albert et al. | 152/504 |
| 2010/0116398 | A1* | 5/2010 | Zhang | B29C 73/22 152/504 |
| 2011/0061782 | A1 | 3/2011 | Merino Lopez et al. | 152/503 |
| 2012/0199260 | A1 | 8/2012 | Merino Lopez et al. | 152/504 |
| 2013/0263989 | A1 | 10/2013 | Voge et al. | 152/502 |
| 2013/0263990 | A1 | 10/2013 | Voge et al. | 152/502 |
| 2016/0187228 | A1* | 6/2016 | Careme | G01M 17/02 73/146 |

FOREIGN PATENT DOCUMENTS

| FR | 2 489 347 A1 | 3/1982 |
|---|---|---|
| JP | H06-270283 A | 9/1994 |
| WO | WO 99/62998 A1 | 12/1999 |
| WO | WO 2008/080556 A1 | 7/2008 |
| WO | WO 2009/135004 A1 | 11/2009 |

OTHER PUBLICATIONS

Notification of Third Office Action issued by SIPO dated Jun. 27, 2017, in connection with counterpart Chinese Application No. 201380009151.7 (English translation only).

* cited by examiner

Fig. 1
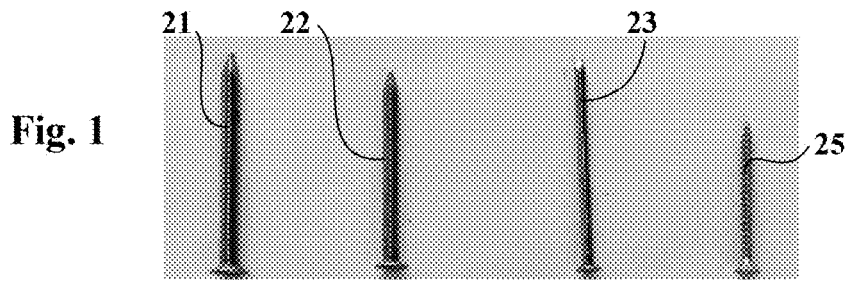
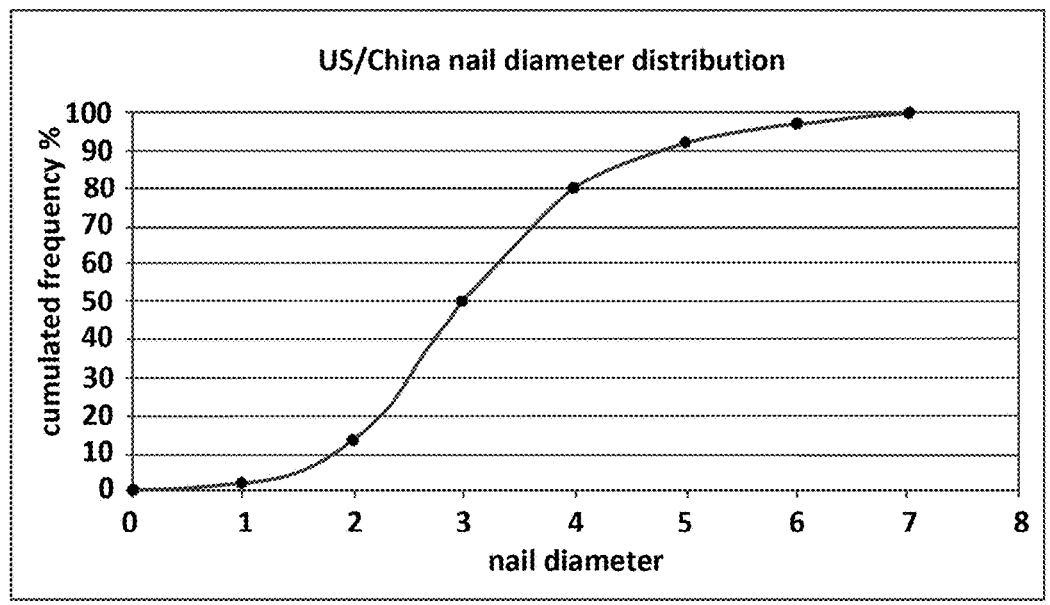
Fig. 2
Fig. 3
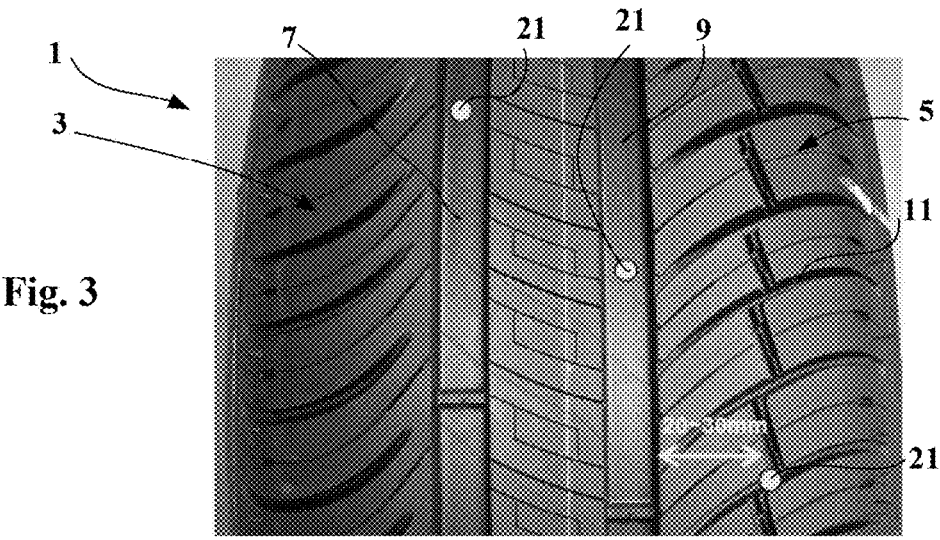

METHOD FOR TESTING THE RESISTANCE OF A TYRE TO PRESSURE LOSS

FIELD OF THE INVENTION

The present invention relates to tyres, and more particularly to a method for testing resistance to a loss of pressure following a puncturing of a tyre.

PRIOR ART

When the wall of a tyre is holed by a puncturing object such as a screw or a nail, or is "punctured", tyre inflation air may escape through the puncture and the resultant loss in pressure may cause the tyre to flatten and the vehicle to stop.

The time that elapses between the act of puncturing and the flattening of the tyre is highly variable, and is notably dependent on the size of the puncturing object but also on whether or not running continues with the puncturing object in place in the wall of the tyre. This running causes relative movements between the puncturing object and the wall of the tyre and this often enlarges the puncture and increases the rate of leakage.

In order to address this problem of punctures, which dates right back to the very start of the use of wheels fitted with pneumatic tyres, the usual solution is to stop and replace the affected wheel with a spare wheel.

Other solutions have been conceived of and are available on the market in order to avoid having to use a spare wheel.

Document U.S. Pat. No. 5,916,931 sets out an aerosol container containing an aqueous latex emulsion mixed with various products including fibrous products and a propellant gas. If the tyre flattens, this container is designed to be fixed to the tyre valve and expel the propellant gas and the sealing/repair emulsion into the internal cavity of the tyre. The tyre is then reinflated, at least partially, the emulsion plugs the puncture and running can be resumed, at a low speed initially in order to distribute the emulsion properly over the entire internal surface of the tyre, and then normally.

There are also repair kits, which are offered by certain motor manufacturers in place of a spare wheel. The benefit of that is that it reduces the weight of the car and therefore the fuel consumption thereof and saves space under the floor of the luggage compartment.

The puncture kit is made up of a compressor, a cylinder of sealant, an electric lead and an air hose. Once the cylinder of sealant has been fixed to the compressor, the air hose has been screwed to the cylinder and to the valve of the tyre and the electric lead has been plugged into the vehicle cigarette lighter, all that remains to be done is to switch the compressor to "on", leaving the engine running in order not to drain the battery.

The sealant empties into the tyre in around 30 seconds during which the pressure in the air hose will rise to around 6 bar. Next, the air will inflate the tyre and the theoretical inflation pressure will be reached within 10 minutes. Once the pressure is reached, all that then remains is for the compressor to be switched off and the kit removed.

Once the tyre has been reinflated, it is necessary to get quickly back behind the wheel and drive 10 km and check the pressure of the tyre using the compressor and the air hose in order to bring it to the required level.

Once the punctured tyre has been repaired, a speed of 80 km/h should not be exceeded and the tyre should be checked or changed soon after. The tyre repair kit is only a temporary repair.

Tyre manufacturers have also proposed tyres provided on their interior wall or within their structure with a layer of elastic, viscous or pasty products referred to as "self-sealing products", that are able to seal punctures. Document WO 2008/080556 A1 discloses one example of such a tyre. These tyres are not puncture-proof as such but the punctures are normally closed or sealed by the self-sealing product.

The manufacturers of these various solutions all offer remarkable puncture-sealing results using their products, notably if a puncture is followed by immediate removal of the puncturing object. However, no test method corresponding to usual driving conditions exists and so it is very difficult to determine how effective these various solutions actually are and compare them against one another.

BRIEF DESCRIPTION OF THE INVENTION

The subject of the invention is a method for testing the resistance of a tyre to a loss in pressure following a puncture, characterized in that it comprises the following steps:
  creating a plurality of punctures in the wall of the tyre by inserting a plurality of puncturing objects through the wall;
  running the tyre with the puncturing objects in it over a given distance with a regulated inflation pressure;
  stopping running; and
  determining, for each puncture, a pressure loss resistance index based on an estimate of the leak rate of the puncture.

This test method has the advantage of being highly selective because of the running performed in the presence of a plurality of puncturing objects. This running causes relative movements between the puncturing objects and the wall of the tyre which relative movements may enlarge the punctures and make them far more difficult to seal or keep sealed. The use of a plurality of puncturing objects of varying types and diameters coupled with running at a regulated pressure means that numerous puncture resistance results can be obtained using a single tyre, thus limiting the number of tests required. It is advantageous to regulate the inflation pressure of the tested tyre in order to compensate for any leaks that may occur during running, particularly if a puncturing object is ejected. That means that the performance of the punctures associated with the other puncturing objects present in the tyre can be studied.

This test method is particularly useful for tyres comprising a self-sealing product, for example a layer of self-sealing product arranged on the interior wall thereof, or in the wall thereof.

When the tyre does not comprise any self-sealing product, upon stopping running and prior to determining the pressure loss resistance index, a sealing product is placed in the internal cavity of the tyre.

This test method therefore allows all the replacement solutions that take the place of a spare wheel in the event of a puncture, and notably tyre inflators and repair kits, to be tested under realistic conditions. Of course, this introduction of a sealant into the internal cavity of the tyre needs to be performed according to the proper procedure specific to each sealing solution tested.

According to one particular embodiment, when a puncturing object has remained in place during running, a pressure loss resistance with the puncturing object in place index $(I_P)$ is determined on the basis of an estimate of the leak rate.

When a puncturing object has been ejected during running, a pressure loss resistance after ejection of the puncturing object index ($I_E$) can be determined on the basis of an estimate of the leak rate.

It will be noticed that these two indices $I_P$ and $I_E$ complement one another.

Alternatively, the test method according to the invention may involve the following additional steps after running has stopped:

extracting the puncturing object from each puncture with the puncturing object in place; and determining for each puncture the puncturing object of which has been ejected during running or extracted at the end of running, a pressure loss resistance index ($I_E$) based on an estimate of the leak rate.

For preference, the test method comprises the additional step of redetermining, after a given time of the order of 5 to 20 min, for each puncture the puncturing object of which has been ejected during running or extracted at the end of running, a pressure loss resistance index ($I_{10}$) based on an estimate of the leak rate.

It is then advantageously possible to calculate a mean pressure loss resistance index ($I_M$) for all the punctures.

The three indices thus obtained, $I_P$, $I_E$ and $I_{10}$, together with the mean index $I_M$, allow the resistance of a tyre to pressure loss following a puncture to be characterized very selectively whether or not this tyre is equipped from the outset with a self-sealing product.

The method may also advantageously comprise, after running has been stopped, all the puncturing objects in place have been extracted and the pressure loss resistance index or indices has or have been determined, the following additional step:

running the inflated tyre without a puncturing object in place; and determining, for each puncture, a pressure loss resistance index based on an estimate of the leak rate.

The additional distance run without a puncturing object may be comprised between 100 and 500 km.

This additional step of running allows the durability of the seal achieved with the sealing/repair device studied to be evaluated.

For preference, the distance for which the inflated tyre comprising the puncturing object through its wall is run is greater than 200 km and very preferably greater than 500 km.

The tyre may be run on a rolling road.

This rolling road preferably has a developed length greater than 16 m.

For preference, the tyre is inflated before the puncturing objects are inserted through the wall thereof.

That makes it easier to insert the puncturing objects.

During running, the tyre inflation pressure is preferably regulated and very preferably regulated to a pressure comprised between 1.8 and 3 bar.

For preference, the speed of running is greater than 90 km/h and very preferably comprised between 90 and 160 km/h.

Advantageously, the speed of running is varied in steps of increasing speed.

These steps of increasing speed allow for accelerated testing with better selectivity.

Advantageously, the plurality of puncturing objects comprises screws and nails of varying diameters.

The diameter of the puncturing objects is preferably from 1 to 5 mm.

Advantageously, the plurality of puncturing objects comprises 3 to 30 puncturing objects, preferably between 8 and 20 objects.

The puncturing objects can be inserted into the crown of the tyre from the exterior surface of the grooves of the tread pattern of the tyre.

They may also be inserted into the tread blocks of the tread pattern of the tyre.

Advantageously, a surfactant is used to visualize and qualitatively assess the leak rate of each puncture.

The following scoring scheme may be used to assess the leak rate of a puncture:

100: no bubble visible, no leak;

80: nanoleak, very small bubbles of diameter smaller than 0.1 mm, visible only with a magnifying glass;

60: microleak, small bubbles visible to the naked eye, of diameters comprised between 0.1 and 1 mm;

0: leak, growing bubbles of diameter greater than 1 mm, or no bubble at all because the air flow rate is too great.

It is also advantageous to determine an overall index by combining the scores for each puncturing object and weighting them using a curve that indicates the frequency at which the objects appear within the customer base.

That makes it possible to have a single index that is suitable for qualifying the puncture resistance of a given tyre under running conditions which are likewise given.

It is, for example, possible to refer to the curve showing the distribution of nail diameters found in a given country.

DESCRIPTION OF THE FIGURES

The attached figures illustrate various aspects of the method for testing the resistance of a tyre to a loss in pressure in the case of a tyre comprising a self-sealing layer on its interior wall:

FIG. 1 shows a number of puncturing objects;

FIG. 2 is a curve, as a cumulative frequency, of the distribution of nail diameters observed in China and in the United States;

FIG. 3 is a partial view from above of the crown of a tyre comprising three punctures;

DETAILED DESCRIPTION OF THE INVENTION

Figure 4:
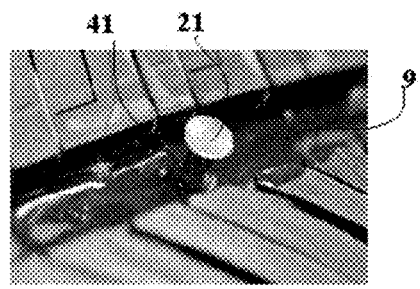
FIG. 4 illustrates the case of a puncture with a zero leak rate.

A Michelin Energy 3 tyre 1 of size 205/55 R 16 provided with a layer of self-sealing product as set out in the aforementioned patent application WO 2008/080556 A1 is tested.

FIG. 1 shows a few examples of puncturing objects commonly used for the test method. These are nails 21 of diameter 3 mm, nails 22 of diameter 4 mm and nails 23 of diameter 5 mm as well as screws 25 of diameter 3.5 mm.

The diameters of these puncturing objects are entirely realistic with respect to the puncturing objects encountered under actual running conditions. FIG. 2 shows, as a cumulative frequency, the distribution of the nails found on the roads in China and in the United States. It may be observed that nails with diameters less than or equal to 5 mm together account for more than 90% of the objects encountered.

Once the tyre has been mounted on an appropriate wheel and inflated to 2.5 bar, the tyre and the wheel are rigidly attached to a rotary hub, not depicted, and a plurality of puncturing objects is inserted through the crown 3 of the tyre 1.

FIG. 3 shows a partial view from above of the crown 3 of the tyre 1. The tyre tread pattern comprises two longitudinal grooves, inboard 7 and outboard 9, and an outboard shoulder 5 with a set of lateral grooves 11. Inboard or outboard refers to the side of the tyre intended to be mounted towards the inside of the vehicle or towards the outside of the vehicle, the tread pattern of this tyre being asymmetric. FIG. 3 shows three punctures by nails 21 arranged in the inboard longitudinal groove 7, the outboard longitudinal groove 9 and the lateral groove 11 of the outboard shoulder 5.

Three nails 21 of diameter 3 mm and with lengths of between 45 and 60 mm, three nails 22 of diameter 4 mm and of similar length, and three nails 23 of diameter 5 mm and of similar length as well as three screws 25 of diameter 3.5 mm and of lengths between 35 and 50 mm have been inserted across the entire crown. The puncturing objects are evenly distributed about the circumference of the crown. The nail 21 pushed into the groove 11 of the shoulder is positioned a distance of between 20 and 30 mm from the outboard longitudinal groove 9.

It is also possible to puncture the crown of the tyre through the tread blocks of the tread pattern but that requires greater penetration force. It also alters the conditions of ejection of the puncturing objects during running.

The inflated tyre and wheel assembly is then fixed to the hub of a roller with a diameter in excess of 16 m in order to get close to the conditions of running on flat ground.

The running conditions are as follows: the inflation pressure is regulated, for example to 2.5 bar, the applied load is of the order of 90% of the load rating of the tyre, and the temperature in the rolling road chamber is regulated to around 20° C., running being in a straight line without torque and with no applied cornering or camber.

The tyre is run under these conditions at speeds of from 100 to 150 km/h in 10 km/h steps, each speed level lasting for 1 hour. The complete test thus goes on for 6 hours and 750 km.

During running, approximately 70% of the 5 mm diameter nails are expelled as too are around 30% of the 4 mm diameter nails. The 3 mm diameter nails normally remain in the crown of the tyre. The screws are not expelled during running either as the screw thread increases the force necessary for extracting them.

It should be noted that in the case of certain types or sizes of tyre, the 3 mm diameter nails may also be expelled.

After running, a cooling phase lasting a minimum of 4 hours is observed.

The result of the test is a qualitative observation of the leaks of each puncture, prior to extraction (if the puncturing object is still present after the running), after extraction and approximately 10 min after extraction.

The leaks are assessed using a surfactant, for example an aerosol canister of the "1000 bubbles" make. The product is sprayed onto the puncture and the assessor notes the presence, size and number of bubbles using a magnifying glass under bright lighting.

Figure 5A:
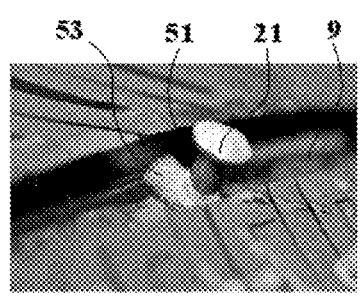
FIGS. 5(a) and (b) illustrate the case of a puncture with a very low leak rate.
Figure 5B:
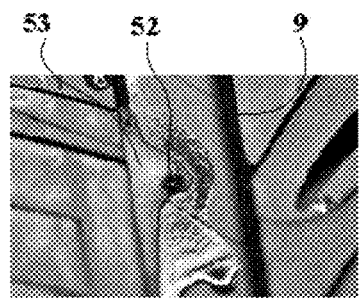

FIGS. 4 to 7 illustrate the various cases observed with the puncturing objects in place (FIGS. 4, 5(*a*), 6 and 7(*a*)) and after they have been extracted or ejected (FIGS. 5(*b*), 7(*b*)).

FIG. 4 shows a nail 21 passing through a puncture 41 positioned in the longitudinal groove 9 of the tyre. No bubble can be seen; there is no leak; the puncture is scored 10 or 100%.

FIG. 5(*a*) shows a puncturing object 21 passing through a puncture 51 located in the longitudinal groove 9 of the tyre. The application of the surfactant reveals a great many very very small bubbles 51, visible only under a magnifying glass and of a diameter less than 0.1 mm. This is a very small leak scored 8 or 80%.

FIG. 5(*b*) shows a puncture 52 made by a puncturing object which has been expelled or extracted. The puncture 52 is likewise situated in the outboard longitudinal groove 9 of the tyre. The application of surfactant also reveals a great many very very small bubbles 51, visible under a magnifying glass and of a diameter smaller than 0.1 mm. This is given the same score 8 or 80%.

Figure 6:
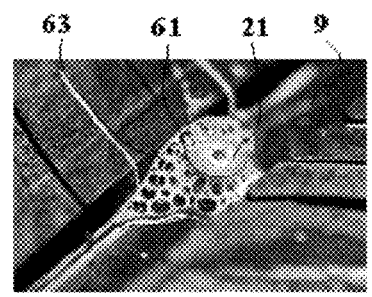
FIG. 6 illustrates the cases of a puncture with a low leak rate.

FIG. 6 shows a puncturing object 21 passing through a puncture 61 located in the outboard longitudinal groove 9 of the tyre. There, the application of the surfactant reveals a collection of small bubbles 63 of a diameter roughly comprised between 0.1 mm and 1 mm. This is a small leak scored 6 or 60%.

Figure 7A:
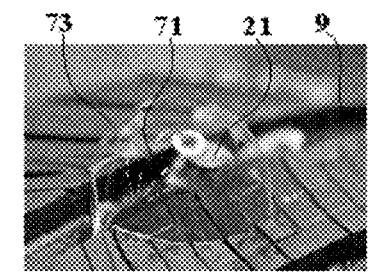
FIGS. 7(a) and (b) illustrate the cases of a puncture with a rapid leak.
Figure 7B:
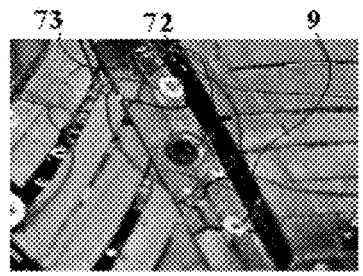

FIG. 7(*a*) shows a puncturing object 21 passing through a puncture 71 still located in a longitudinal groove of the tyre. The application of the surfactant reveals a single large bubble 73 of diameter greater than 1 mm. This is a leak that scores 0 or 0%.

FIG. 7(*b*) shows, in the longitudinal groove of the tyre, a puncture 72 the puncturing object for which has been expelled during running or extracted after stopping. Likewise, just one single large bubble 73 of a diameter greater than 1 mm can be seen. This is a leak that scores 0 or 0%.

The following tables indicate the results of the test.

TABLE 1

| | Before running | | | | | | | | | | | |
|---|---|---|---|---|---|---|---|---|---|---|---|---|
| | Nail ø 5 mm | | | Nail ø 4 mm | | | Nail ø 3 mm | | | Screw ø 3.5 mm | | |
| Position | ILG | OLG | TG | ILG | OLG | TG | ILG | OLG | TG | ILG | OLG | TG |
| Score | 10 | 10 | 10 | 10 | 10 | 10 | 10 | 10 | 10 | 0 | 0 | 0 |

ILG  Inboard longitudinal groove
OLG  Outboard longitudinal groove
TG   Transverse groove Table 1 above indicates the results observed when the puncturing objects are pushed into the crown of the tyre. Twelve puncturing objects were inserted, of four different types, each type at three different positions as indicated.

It will be noted that the insertion of the screws 25 in this example causes an immediate leak to occur. However, this leak usually disappears when the tyre is driven on.

TABLE 2

Table 2 - Index $I_P$

After running, puncturing objects in place in the tyre

| | Nail ø 5 mm | | | Nail ø 4 mm | | | Nail ø 3 mm | | | Screw ø 3.5 mm | | |
|---|---|---|---|---|---|---|---|---|---|---|---|---|
| Position | ILG | OLG | TG | ILG | OLG | TG | ILG | OLG | TG | ILG | OLG | TG |
| Score | x | x | x | 10 | 10 | 10 | 10 | 10 | 10 | 10 | 10 | 10 |

TABLE 3

Reminder of the scoring scheme

| | |
|---|---|
| 10 | no leak |
| 8 | very small leak |
| 6 | small leak |
| 0 | leak |
| x | object ejected |

Table 2 gives the results obtained for the puncturing objects that have remained in place in the crown of the tyre. As indicated previously, the 5 mm diameter nails were ejected, but no puncture with the objects in place reveals a leak. The indices $I_P$ for all of the punctures with the puncturing object in place are all equal to 10.

TABLE 4

Indices $I_E$-$I_{10}$

After running, puncturing objects ejected or extracted

| | Nail ø 5 mm | | | Nail ø 4 mm | | | Nail ø 3 mm | | | Screw ø 3 m 5 mm | | |
|---|---|---|---|---|---|---|---|---|---|---|---|---|
| Position | ILG | OLG | TG | ILG | TG | OLG | ILG | OLG | TG | ILG | TG | OLG |
| Time | t0 t10 | t0 t10 | t0 t10 | t0 t10 | t0 t10 | t0 t10 | t0 t10 | t0 t10 | t0 t10 | t0 t10 | t0 t10 | t0 t10 |
| Ejected | 8 10 | 8 0 | 10 10 | | | | | | | | | |
| Extracted | | | | 10 10 | 8 10 | 10 10 | 8 10 | 8 10 | 10 10 | 8 10 | 8 8 | 8 8 |

Table 4 gives the results obtained after running and following extraction of all the puncturing objects still in place. Note that there are two scores, the first at the time t0 immediately following extraction and t10, 10 minutes thereafter.

It may be noted that the greatest spread on the results obtained is obtained for larger diameter objects and that the results are better 10 minutes after extraction than immediately after extraction.

Figure 8:
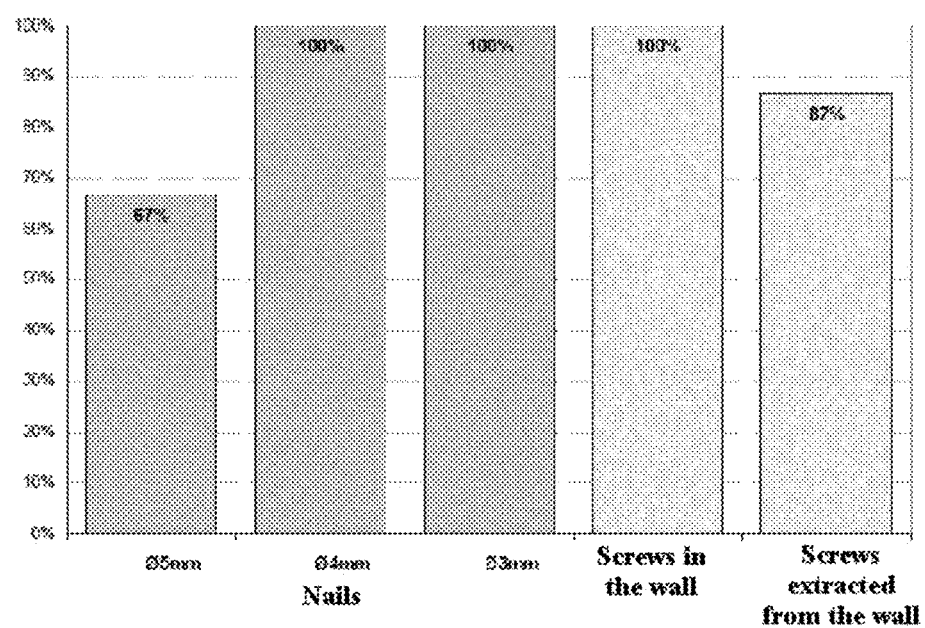
FIG. 8 shows the result of a puncture resistance test.

FIG. 8 provides a graphical indication $I_{10}$ of the results obtained at t10 as a function of the nature of the puncturing objects.

No leak is observed for nails of diameters 3 and 4 mm and screws remaining in the tyre, but there is a degradation to 67% for 5 mm diameter nails and to 87% for screws following extraction thereof.

A level of cover can also be calculated by weighting the indices $I_{10}$ using the nail diameter distribution found in the customer base (see FIG. 2). In the case described, that leads to an overall value of 94%, which is an excellent result.

The same tyre then underwent additional running after the indices indicating resistance to loss of pressure following ejection or removal of the puncturing objects had been determined for all the punctures. At the end of this additional running it was found that all the indices were 10 or 100%; there were no longer any leaks.

The combined score as described hereinabove is not the only conceivable score. Other combined scores are possible, for example combining the nails score and the screws score, with a certain weighting. Obviously the scores for the various stages of the test can also be used separately (for example the score for the nails or for the screws before pulling out and after pulling out).

The test described was for a tyre equipped as original equipment with a layer of self-sealing product. As has already been indicated, the test described also allows the other solutions such as tyre inflators and repair kits to be tested.

Tests were conducted with these other solutions. It is found that the sealing performance is practically 100% for all the solutions in the event of a puncture with instant removal of the puncturing object. By contrast, if the tyre is run with the puncturing object in place, after as little as 200 to 300 km of running, the performance of tyre inflators becomes zero, the product escaping through the punctures. As far as repair kits are concerned, these perform better but the performance drops off very greatly also with the length of running performed with the puncturing objects still in place.

The test thus described has the advantage of being highly selective and of being based on an analysis of the leak rates of each puncture rather than on a loss in pressure, and this allows numerous results to be obtained with one single tyre.

The invention claimed is:
1. A method for testing a resistance of a tyre to a loss in pressure following puncturing of the tyre, the method comprising steps of:
creating a plurality of punctures in a wall of the tyre by inserting a plurality of puncturing objects through the wall;
running the tyre with the puncturing objects in the wall thereof over a given distance;
regulating an inflation pressure of the tyre during the running step;
stopping the running of the tyre; and,
after completing the running step, determining, for each puncture, a pressure loss resistance index based on an estimate of a leak rate of the puncture, wherein the puncturing objects are ejectable from the wall of the tyre during the running step, and
wherein the puncturing objects include a combination of 8 to 30 screws and nails of different diameters.

2. The test method according to claim 1, further comprising a step of, when the tyre does not include any self-sealing product, after the stopping step and prior to the determining step, placing a sealing product in an internal cavity of the tyre.

3. The test method according to claim 1, wherein, when at least one of the puncturing objects has remained in place during the running step, for each puncture corresponding to a puncturing object that has remained in place during the running step, a pressure loss resistance with the puncturing object in place index ($I_P$) is determined based on an estimate of a leak rate.

4. The test method according to claim 1, wherein, when at least one of the puncturing objects has been ejected from the wall of the tyre during the running step, for each puncture corresponding to a puncturing object that has been ejected during the running step, a pressure loss resistance after ejection of the puncturing object index ($I_E$) is determined based on an estimate of a leak rate.

5. The test method according to claim 1, further comprising steps of, after the running step:
extracting each puncturing object still in place after the running step; and
determining, for each puncture corresponding to a puncturing object that has been ejected during the running step or that has been extracted in the extracting step, a pressure loss resistance index ($I_E$) based on an estimate of a leak rate.

6. The test method according to claim 1, further comprising a step of redetermining, after a given time of 5 to 20 minutes, for each puncture corresponding to a puncturing object that has been ejected during the running step or that has been extracted after the running step, a pressure loss resistance index ($I_{10}$) based on an estimate of a leak rate.

7. The test method according to claim 1, further comprising a step of calculating a mean pressure loss resistance index ($I_M$) for all punctures.

8. The test method according to claim 1, wherein, during the running step, the tyre is run a distance greater than 200 km.

9. The test method according to claim 1, wherein, during the running step, the tyre is run on a rolling road.

10. The test method according to claim 9, wherein a developed length of the rolling road is greater than 16 m.

11. The test method according to claim 1, wherein the tyre is inflated before the puncturing objects are inserted through the wall of the tyre.

12. The test method according to claim 1, wherein the regulated inflation pressure during the running step is a pressure between 1.8 and 3 bar.

13. The test method according to claim 1, wherein, during the running step, the tyre is run at a speed in a range of 90 km/h to 160 km/h.

14. The test method according to claim 13, wherein, during the running step, the speed varies in steps of increasing speed.

15. The test method according to claim 5, further comprising steps of, after the running step, after the extracting step, and after the determining step:
running the tyre in an inflated condition for an additional distance without a puncturing object in place; and
determining, for each puncture, a pressure loss resistance index based on an estimate of a leak rate.

16. The test method according to claim 15, wherein, during the additional distance run by the tyre is between 100 and 500 km.

17. The test method according to claim 1, wherein a diameter of at least one of the puncturing objects is from 1 to 5 mm.

18. The test method according to claim 1, wherein at least one of the puncturing objects is inserted through a crown portion of the tyre.

19. The test method according to claim 18, wherein the at least one of the puncturing objects is inserted through the crown portion of the tyre from an exterior surface of grooves of a tread pattern of the tyre.

20. The test method according to claim 18, wherein the at least one of the puncturing objects is inserted through the crown portion of the tyre from an exterior surface of a tread block of a tread pattern of the tyre.

21. The test method according to claim 1, further comprising a step of using a surfactant to visualize and qualitatively assess a leak rate of a puncture.

22. The test method according to claim 21, wherein a scoring scheme is used to assess the leak rate of a puncture, in which
a score of 100 corresponds to no leak, with no bubble visible;
a score of 80 corresponds to a nanoleak, with very small bubbles having a diameter smaller than 0.1 mm and visible only with a magnifying glass;
a score of 60 corresponds to a microleak, with small bubbles having diameters between 0.1 and 1 mm and visible by naked eye; and
a score of 0 corresponds to a leak, with growing bubbles having a diameter greater than 1 mm, with or no bubble at all due to an excessive air flow rate.

23. The test method according to claim 1, further comprising a step of determining an overall index by combining scores corresponding to the puncturing objects and weighting the scores using a curve that indicates a frequency at which the puncturing objects appear within a customer base.

* * * * *

UNITED STATES PATENT AND TRADEMARK OFFICE
CERTIFICATE OF CORRECTION

PATENT NO. : 9,772,258 B2
APPLICATION NO. : 14/374950
DATED : September 26, 2017
INVENTOR(S) : Jose Merino Lopez et al.

It is certified that error appears in the above-identified patent and that said Letters Patent is hereby corrected as shown below:

In the Specification

Column 4:
Line 47, "cases" should read --case--.

Column 6:
Line 28, "very very" should read --very, very--.

In the Claims

Column 10:
Line 15, "during" should be deleted.
Line 46, "with or" should read --or with--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*